United States Patent [19]

Komaki

[11] Patent Number: 5,057,676
[45] Date of Patent: Oct. 15, 1991

[54] PORTABLE ELECTRONIC APPARATUS

[75] Inventor: Shigeki Komaki, Nara, Japan

[73] Assignee: Sharp Kabushiki Kaisha, Osaka, Japan

[21] Appl. No.: 559,288

[22] Filed: Jul. 30, 1990

[30] Foreign Application Priority Data

Aug. 8, 1989 [JP] Japan ................................ 1-93137[U]

[51] Int. Cl.⁵ .............................................. G06F 15/20
[52] U.S. Cl. .................................... 235/375; 235/432;
361/398; 364/708
[58] Field of Search ................ 235/375, 432; 361/398;
364/708

[56] References Cited

U.S. PATENT DOCUMENTS

| 4,901,261 | 2/1990 | Fuhs | 364/708 |
| 4,918,632 | 4/1990 | York | 364/708 |
| 4,939,514 | 7/1990 | Miyazaki | 364/708 |

FOREIGN PATENT DOCUMENTS 60-10348 1/1985 Japan .
60-39166 3/1985 Japan .

Primary Examiner—Harold Pitts
Attorney, Agent, or Firm—David G. Conlin

[57] ABSTRACT

A portable electronic apparatus includes an electronic main unit having a front surface, a rear surface, side surfaces, and a first electrical connector. The electronic main unit is served to perform arithmetic operation. The apparatus further includes a cover member provided on one of the side surfaces of the electronic main unit, for openably covering the front surface of the electronic main unit. The apparatus also includes an electronic sub-unit capable of being coupled with the electronic main unit. This electronic sub-unit has a support portion to be located behind the electronic main unit to support the rear surface, a handle portion projected from side of the electronic sub-unit for supporting the cover member when the cover member is opened, a second electrical connector capable of being connected to the first electrical connector, and an auxiliary electrical device capable of being cooperated with the electronic main unit.

13 Claims, 6 Drawing Sheets

PORTABLE ELECTRONIC APPARATUS

BACKGROUND OF THE INVENTION

1. Field of the Invention

The present invention relates to a portable electronic apparatus and more particularly to an apparatus such as a terminal unit for point of sales.

2. Description of the Related Art

As a representative related art, the present applicant knows a portable terminal device for point of sales (POS) used, for example, in a supermarket. This kind of portable terminal device typically has a main unit, a printer, and a main connector for connecting the main unit and the printer. The printer is allowed to be removed from the main unit. The main unit includes arranged keys, a display for displaying information to be inputted on the arranged keys, one or more electric connectors for connecting the main unit to an interface of a main computer, and a microcomputer. An operator normally operates to input information into the main unit through the keys as he or she is carrying it. Then, the printer connected to the main unit serves to print the information on recording paper and the microcomputer stores it in its memory. Then, the operator connects the main unit to the main computer through the connectors for storing the information saved in the memory into the main computer. If the operator needs to use only the main unit, as mentioned above, the printer may be removed from the main unit without bringing about any disadvantage.

If, however, the operator needs to frequently use the printer, it is desirous that the main unit is integrally connected with the printer, because the integral construction is more usable and convenient in carrying itself. For operators who do not need to use the printer, on the other hand, this integral construction increases the overall dimensions by the printer area, thereby making portability inferior because of the unnecessary printer. Moreover, the printer itself push up the overall cost.

SUMMARY OF THE INVENTION

It is therefore an object of the present invention to provide portable electronic apparatus which can offer improved usability.

According to the present invention, the above object can be attained by a portable electronic apparatus which comprises: an electronic main unit having a front surface, a rear surface, side surfaces, and a first electrical connector, the electronic main unit being served to perform arithmetic operation; a cover member provided on one of the side surfaces of the electronic main unit, for openably covering the front surface of the electronic main unit; and an electronic sub-unit capable of being coupled with the electronic main unit, the electronic sub-unit having a support portion to be located behind the electronic main unit to support the rear surface, a handle portion projected from a side of the electronic sub-unit for supporting the cover member when the cover member is opened, a second electrical connector capable of being connected to the first electrical connector, and an auxiliary electrical device capable of being cooperated with the electronic main unit.

In operation, the second electrical connector of the electronic sub-unit may be connected to the first electrical connector so that the electronic main unit is allowed to cooperate with the electronic sub-unit.

The cover member may be served as not only a protective cover for the electronic main unit but also a cover having another additional functions.

When the cover member is opened, the handle portion of the sub-unit functions to support the cover member. This function limits a degree formed between the cover member and the electronic main unit to a proper range. It results in giving no damage to a connecting portion such as a hinge formed between the cover member and the electronic main unit. Further, if the arranged keys are provided in the main unit, the operator can input the information on the keys.

The support portion of the sub-unit will be located on the back of the main unit in a manner to support the main unit. After the cover member is closed, the operator can thus carry the connected construction of the main unit and the sub-unit with the handle portion projected on the side of the support portion.

As described above, if the operator needs to use only the electronic main unit and the cover member provided on the side of the main unit, it is possible to easily remove the sub-unit from the main unit. If he or she uses the sub-unit, the main unit is compactly connected to the sub-unit. It results in making the connected construction of the main unit and the sub-unit more usable and convenient in carrying itself.

The electronic main unit and the cover member may include hinge means for coupling them with each other so that the cover member can be opened on hinges.

Preferably, the hinge means includes first brackets projected from the side surface of the electronic main unit, second brackets projected from a side of the cover member, and hinge pins inserted through both of the first and second brackets.

Preferably, the electronic main unit includes arranged keys and a display means disposed on the front surface.

The electronic main unit may further include an internal battery and means for inserting a memory card to receive data of various kinds of functions from the inserted memory card.

The cover member preferably includes an inner surface opposed to the front surface of the electronic main unit during covering, and arranged keys disposed on the inner surface.

It is preferred that the apparatus further comprises a flexible printed wiring film for electrically connecting the arranged keys of the cover member with the electronic main unit.

The electronic main unit may include a processing circuit for performing arithmetic operation.

This processing circuit may be a microcomputer.

Preferably, the electronic main unit includes a third electrical connector for sending the arithmetic operation result therethrough to a main computer.

The electronic sub-unit may be a printer. The apparatus may be a terminal device used for point of sales.

Further objects and advantages of the present invention will be apparent from the following description of the preferred embodiments of the invention as illustrated in the accompanying drawings.

DESCRIPTION OF THE PREFERRED EMBODIMENTS

Figure 1:
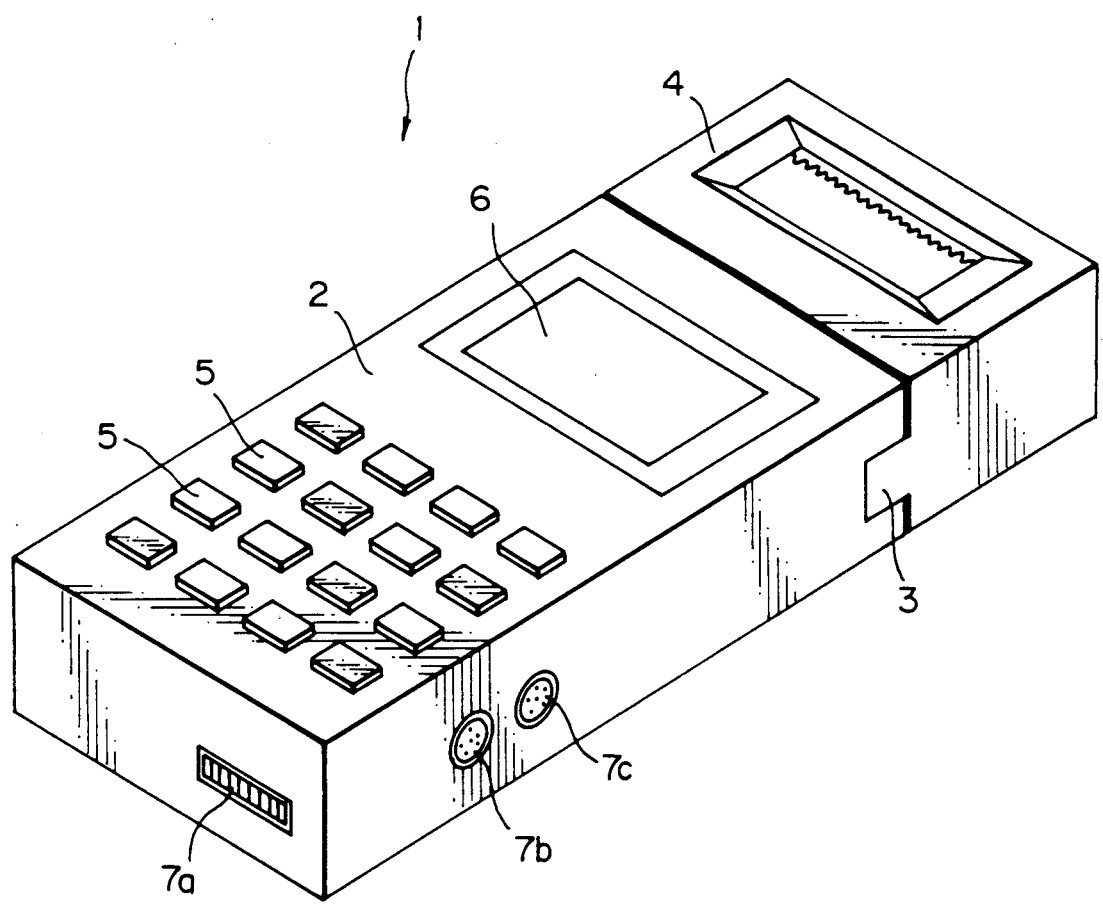
FIG. 1 is a perspective view illustrating a representative related art.

At first, for easier and deeper understanding of the invention, a representative art the present invention concerns with will be described with reference to FIG. 1.

As shown, 1 denotes a portable terminal device for point of sales used, for example, in a supermarket. This portable terminal device includes a main unit 2, a main connector 3, and a printer 4 connected to the main unit 2 through the main connector 3. The printer 4 is optional, that is, may be removed. The main unit 2 contains arranged keys 5, a display 6 for displaying information input on the arranged keys 5, a microcomputer, and electric connectors 7a, 7b, 7c for connecting the main unit 2 to an interface of a main computer.

In operation, at first, an operator inputs information as he or she is carrying it. Then, the printer 4 serves to print the content of information on recording paper and the microcomputer stores it in its memory. The stored information will be sent to the main computer through the electric connectors 7a, 7b, and 7c. It goes without saying that at that time the main unit 2 has been already connected to the main computer through these connectors. If the operator needs to use only the main unit 2, the printer may be removed.

Hereinafter, the description will be directed to a preferred embodiment of the invention with reference to FIG. 2.

Figure 2:
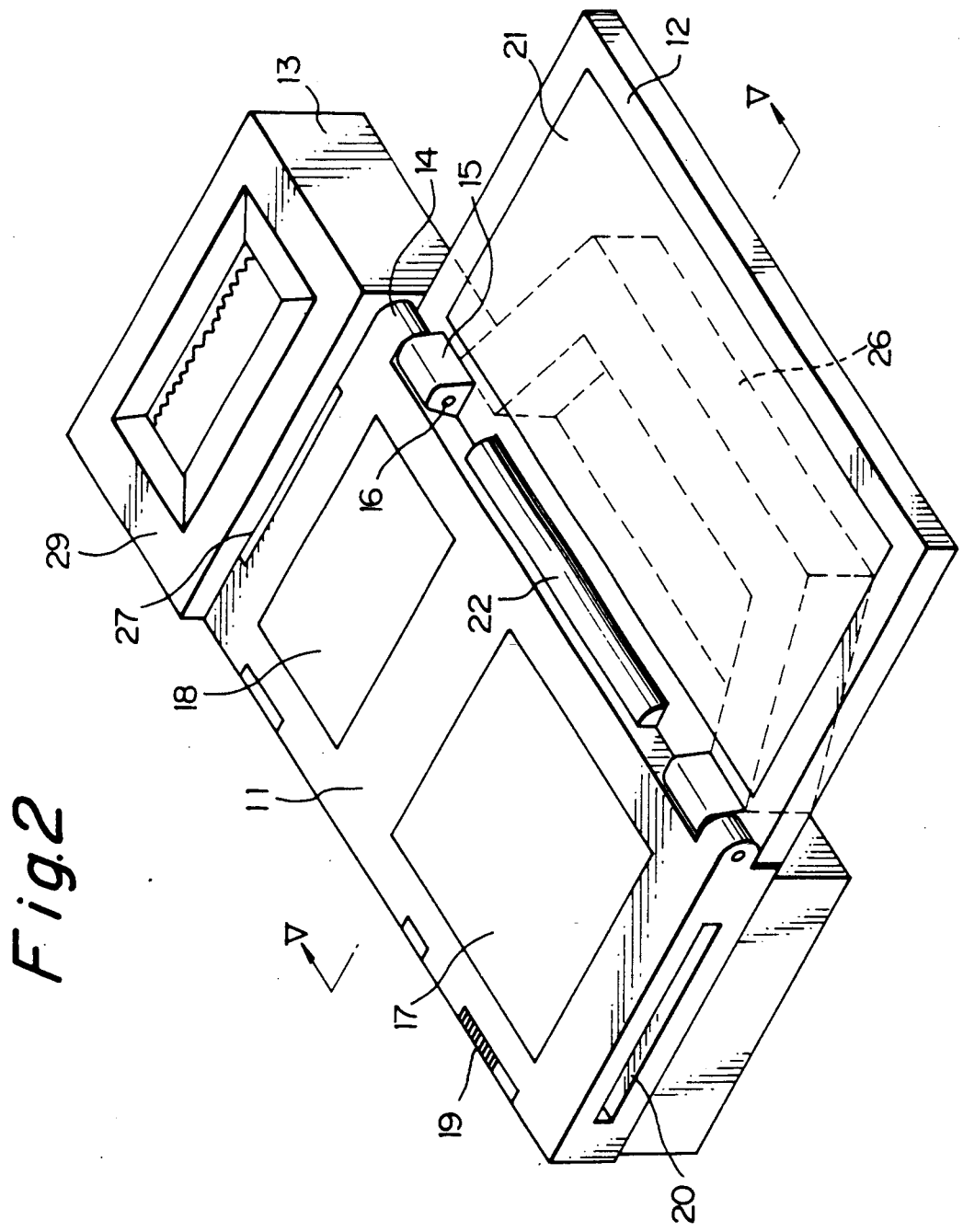
FIG. 2 is a perspective view illustrating an embodiment of the present invention.

FIG. 2 is a perspective view illustrating a terminal device for point of sales.

As shown, this terminal device basically comprises an electronic main unit 11, an openable cover member 12 provided on the side surface of the main unit 11, and an electronic sub-unit 13. The main unit 11 is capable of detachably attached on the sub-unit 13.

Figure 3:
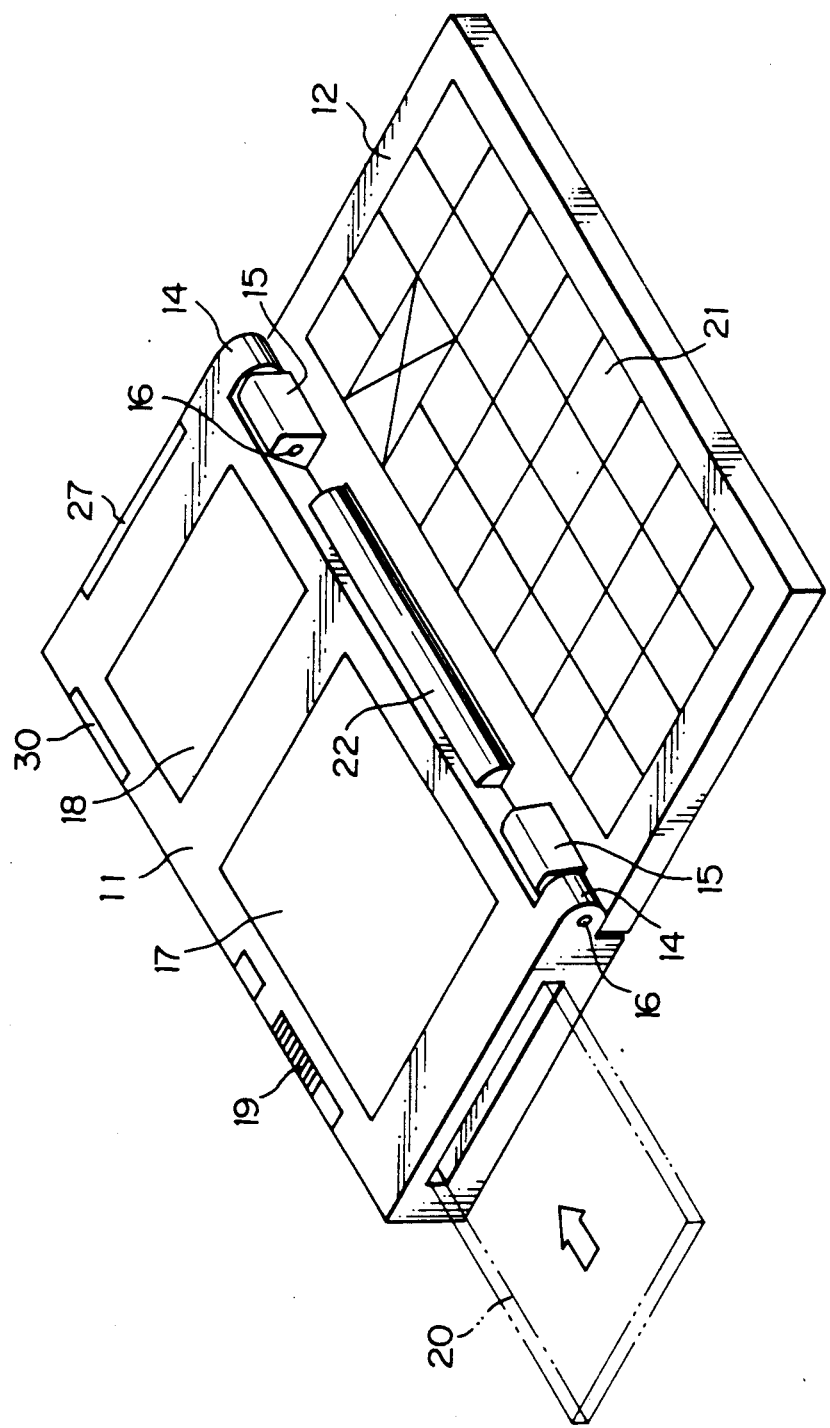
FIG. 3 is a perspective view illustrating how an electronic main unit is connected to a cover member.

FIG. 3 is a perspective view illustrating the main unit 11 and the opened cover member 12.

The main unit 11 provides two brackets 14 projected from the right side surface thereof. The cover member 12 provides two brackets 15 matching to the brackets 14. Hinge pins 16 are inserted into these brackets 14 and 15 so that the cover member 12 is allowed to open from the top surface of the main unit 11 on hinges. The main unit 11 includes arranged keys 17 having alphanumeric keys for inputting information, a liquid-crystal display 18 for displaying the input information and the arithmetic operation result of the information, and a battery switch 19. The main unit 11 contains a battery built therein so that an operator can use the main unit 11 even when carrying it.

The main unit 11 can receive a memory card 20 as viewed by an imaginary line of FIG. 3. This memory card 20 supplies information so that the main unit 11 can perform various kinds of functions.

The other arranged keys 21 are provided on an inner surface of the cover member 12, that is, on the surface opposing to the arranged keys 17 of the terminal main body 11 when the cover member 12 is closed. The terminal main body 11 is electronically connected to the arranged keys 21 through a flexible printed wiring film 22.

Figure 4:
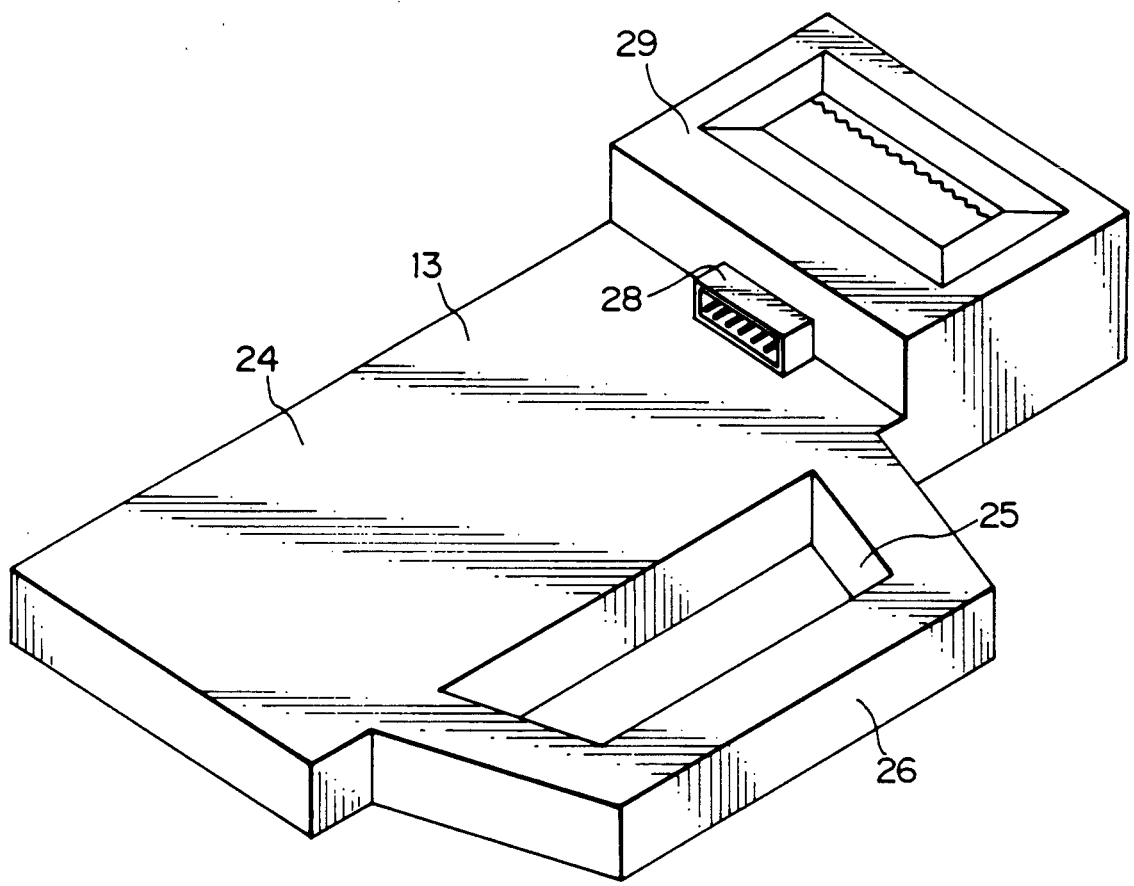
FIG. 4 is a perspective view illustrating an electronic sub-unit.

FIG. 4 is a perspective view illustrating the sub-unit 13. The sub-unit 13 has a support portion 24 having a flat surface for supporting terminal main body 11, a handle portion 26 having an insertion hole 25 into which an operator can put his or her fingers, a second connector 28 to be electrically connected to the first connector 27 provided in the main unit 11, and a printer 29 connected to the second connector 28. The handle portion 26 is projected on the right side of the supporting portion as viewed in FIG. 4 so that the handle portion 26 can support the opened cover member 12 as viewed in FIG. 2. The printer 29 electrically works with the terminal main body 11 in order to print the arithmetic operation result on recording paper.

Figure 5:
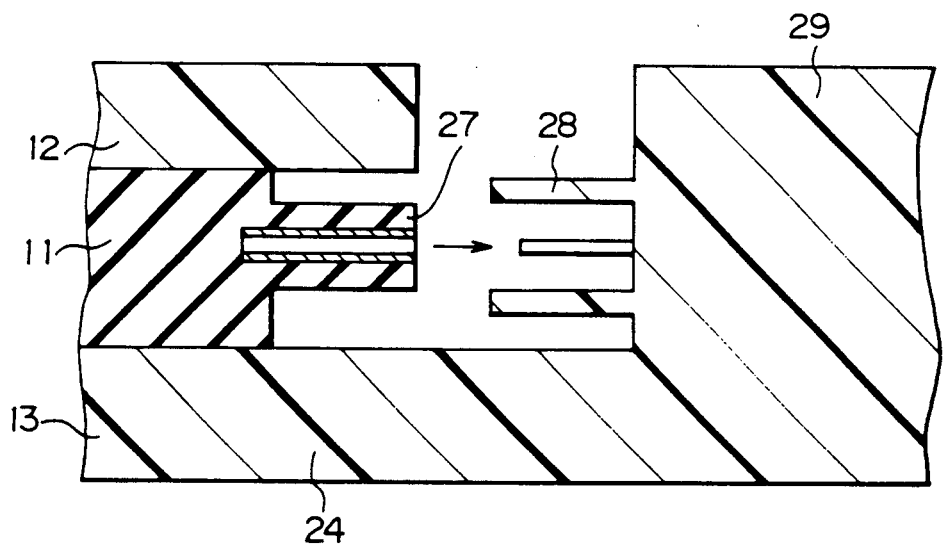
FIG. 5 is a sectional view illustrating a first and a second connectors.

FIG. 5 is a sectional view illustrating how the first connector 27 is connected to the second connector 28. The first connector 27 contains a lot of connecting sockets and the second connector 28 contains a lot of pins respectively opposing to these connecting sockets. These pins are respectively inserted into the connecting sockets for implementing electric connection and integral mechanical connection between the main unit 11 and the support portion 24 in a manner to allow the main unit 11 to be supported on the flat surface of the support portion 24.

The main unit 11 provides an additional connector 30 (see FIG. 3) for connecting the main unit 11 to a main computer (not shown) so that the main unit 11 can transfer the input information or the arithmetic operation result to the main computer.

Figure 6:
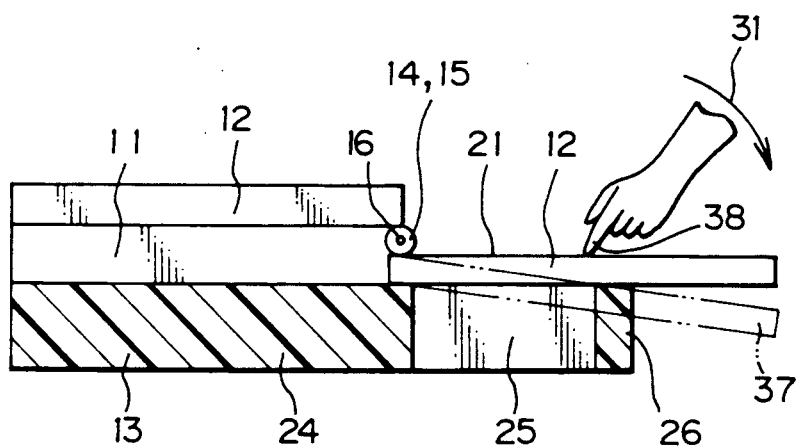
FIG. 6 is a sectional view cut away on the line V—V of FIG. 1 illustrating the terminal device for point of sales and the sub-unit.

FIG. 6 is a sectional view cut away on the line V—V of FIG. 2 illustrating the terminal device for point of sales and the sub-unit. As shown in FIG. 6, when the cover member 12 is opened from the main unit 11 on hinges, the cover member 12 is supported by the handle portion 26 so that the cover member 12 is disallowed to form an excessive opening angle, that is, take the imaginary posture shown by a reference number 37. It results in giving no damage to the flexible wiring film 22 (FIG. 2) as well as the hinge or a portion around it, the hinge consisting of the brackets 14, 15 and the hinge pins 16 as shown in FIG. 2. Further, when an operator uses the arranged keys 21 provided on the cover member 12, he or she can input information in a stable state, because the opened cover member 12 is supported by the handle portion 26. If no handle portion is provided, the cover member 12 may be transformed into the imaginary posture as shown by the line 37 of FIG. 6 when the operator pushes the keys, thereby being damaged. The handle portion 26 thus makes contribution to overcoming this shortcoming.

Figure 7:
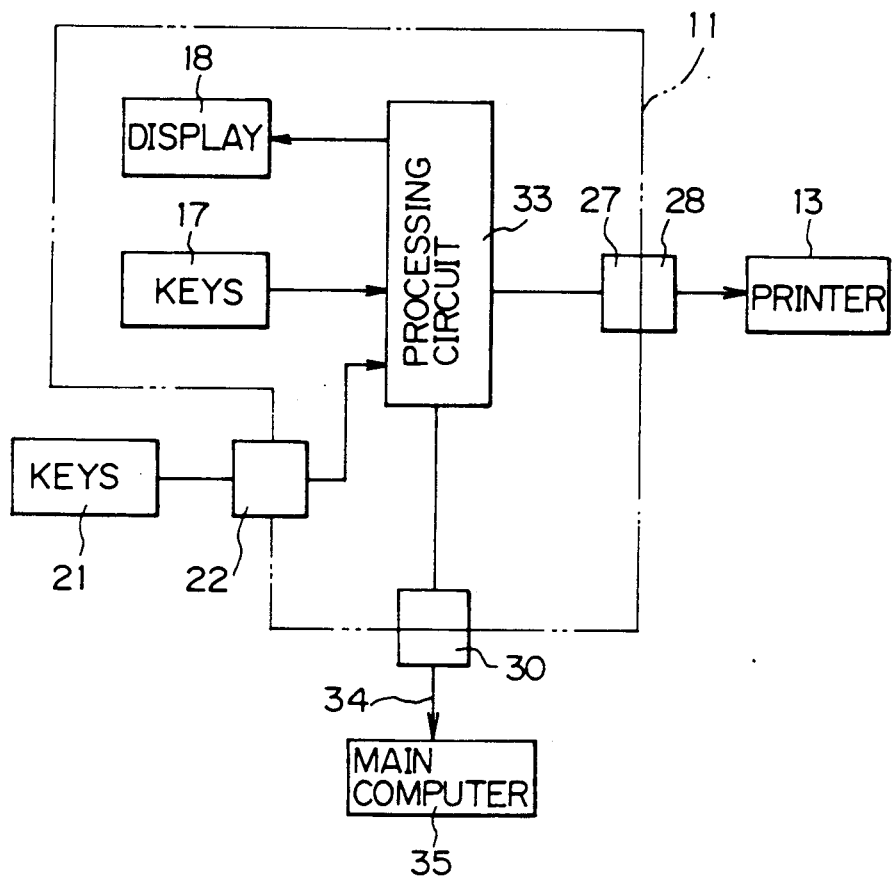
FIG. 7 is a block diagram showing electronic arrangement of the embodiment illustrated in FIGS. 2 to 6.

FIG. 7 is a block diagram showing electrical arrangement of the embodiment illustrated in FIGS. 2 to 6. The main unit 11 includes a processing circuit 33 built therein. The processing circuit 33 can be realized by a microcomputer and memories. It receives a signal supplied from both of the arranged keys 17 and 21 respectively provided on the main unit 11 and the cover member 12 through the flexible wiring film 22 and displays the arithmetic operation result of the signal on the display 18. And, it serves to send the information to the printer 29 through the first and the second connectors 27 and 28. The arithmetic operation result is supplied from the processing circuit 33 to the main computer 35 through the connector 30 and a cable 34.

The present invention widely applies to the other portable electronic apparatus without being limited to the terminal device for point of sales used in a supermarket or the like.

Many widely different embodiments of the present invention may be constructed without departing from the spirit and scope of the present invention. It should be understood that the present invention is not limited to the specific embodiments described in the specification, except as defined in the appended claims.

What is claimed is:

1. A portable electronic apparatus comprising:
    an electronic main unit having a front surface, a rear surface, side surfaces, and a first electrical connector, said electronic main unit being served to perform arithmetic operation;
    a cover member provided on one of said side surfaces of said electronic main unit, for openably covering said front surface of said electronic main unit; and
    an electronic sub-unit capable of being coupled with said electronic main unit, said electronic sub-unit having a support portion to be located behind said electronic main unit to support said rear surface, a handle portion projected from a side of said electronic sub-unit for supporting said cover member when the cover member is opened, a second electrical connector capable of being connected to said first electrical connector, and an auxiliary electrical device capable of being cooperated with said electronic main unit.

2. A portable electronic apparatus as claimed in claim 1, wherein said electronic main unit and said cover member include hinge means for coupling them with each other so that said cover member can be opened on hinges.

3. A portable electronic apparatus as claimed in claim 2, wherein said hinge means includes first brackets projected from said side surface of said electronic main unit, second brackets projected from a side of said cover member, and hinge pins inserted through both of said first and second brackets.

4. A portable electronic apparatus as claimed in claim 1, wherein said electronic main unit includes arranged keys and a display means disposed on said front surface.

5. A portable electronic apparatus as claimed in claim 4, wherein said electronic main unit includes an internal battery.

6. A portable electronic apparatus as claimed in claim 1, wherein said electronic main unit includes means for inserting a memory card to receive data of various kinds of functions from the inserted memory card.

7. A portable electronic apparatus as claimed in claim 1, wherein said cover member includes an inner surface opposed to said front surface of said electronic main unit during covering, and arranged keys disposed on said inner surface.

8. A portable electronic apparatus as claimed in claim 7, wherein said apparatus further comprises a flexible printed wiring film for electrically connecting said arranged keys of said cover member with said electronic main unit.

9. A portable electronic apparatus as claimed in claim 1, wherein said electronic main unit includes a processing circuit for performing arithmetic operation.

10. A portable electronic apparatus as claimed in claim 9, wherein said processing circuit includes a microcomputer.

11. A portable electronic apparatus as claimed in claim 1, wherein said electronic main unit includes a third electrical connector for sending the arithmetic operation result therethrough to a main computer.

12. A portable electronic apparatus as claimed in claim 1, wherein said electronic sub-unit includes a printer.

13. A portable electronic apparatus as claimed in claim 1, wherein said apparatus is a terminal device used for point of sales.

* * * * *